(12) United States Patent
Khapre et al.

(10) Patent No.: US 11,055,754 B1
(45) Date of Patent: Jul. 6, 2021

(54) ALERT EVENT PLATFORM

(75) Inventors: Vishal Dilip Khapre, Strongsville, OH (US); John Curtis Olson, Medina, OH (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 12/984,050

(22) Filed: Jan. 4, 2011

(51) Int. Cl.
G06Q 30/06 (2012.01)
G06Q 10/10 (2012.01)

(52) U.S. Cl.
CPC .............. *G06Q 30/06* (2013.01); *G06Q 10/10* (2013.01)

(58) Field of Classification Search
CPC ........ G06Q 30/06; G06Q 10/10; G06Q 20/00; G06F 7/00; G06F 17/30; G06F 21/00
USPC ............ 705/1.1, 30; 709/219, 230; 707/100, 707/737, 999, 3, 102; 715/530; 726/25; 455/412
See application file for complete search history.

(56) References Cited

U.S. PATENT DOCUMENTS

| | | | |
|---|---|---|---|
| 6,513,019 B2 | 1/2003 | Lewis | |
| 6,519,571 B1 | 2/2003 | Guheen et al. | |
| 6,615,258 B1 | 9/2003 | Barry et al. | |
| 6,671,818 B1 | 12/2003 | Mikurak | |
| 6,957,186 B1 | 10/2005 | Guheen et al. | |
| 7,181,438 B1 | 2/2007 | Szabo | |
| 7,272,660 B1 | 9/2007 | Powers et al. | |
| 7,310,684 B2 | 12/2007 | Patrick et al. | |
| 7,313,447 B2 | 12/2007 | Hsiung et al. | |
| 7,370,004 B1 | 5/2008 | Patel et al. | |
| 7,412,481 B2 | 8/2008 | Nicholls et al. | |
| 7,454,475 B1 | 11/2008 | Coleman | |
| 7,467,198 B2 | 12/2008 | Goodman et al. | |
| 7,557,702 B2 | 7/2009 | Eryurek et al. | |
| 7,606,741 B2 | 10/2009 | King et al. | |
| 7,653,008 B2 | 1/2010 | Patrick et al. | |
| 7,669,177 B2 | 2/2010 | Gerber et al. | |
| 7,698,276 B2 | 4/2010 | Seshadri et al. | |
| 7,698,316 B2 | 4/2010 | Song et al. | |
| 7,702,739 B1 | 4/2010 | Cheng et al. | |
| 7,716,077 B1 | 5/2010 | Mikurak | |
| 7,801,896 B2 | 9/2010 | Szabo | |
| 7,949,574 B2 | 5/2011 | Patel et al. | |

(Continued)

OTHER PUBLICATIONS

U.S. Appl. No. 12/984,075, filed Jan. 4, 2011.

(Continued)

*Primary Examiner* — Lynda Jasmin
*Assistant Examiner* — Kimberly L Evans
(74) *Attorney, Agent, or Firm* — Buchanan Ingersoll & Rooney PC

(57) ABSTRACT

Various systems, processes, tools and techniques are provided for managing and processing alerts associated with different business events that impact a corporate entity. In various aspects, the system may employ an event-driven architecture to process business events and then provide customers and other system users with a mechanism for having have visibility into those business events through a subscription process, for example. Subscribers may be offered the ability to tap into different streams of business events, filter the event streams to obtain information only for events of interest, and then receive alerts associated with the events via one or more communication media or channels.

19 Claims, 7 Drawing Sheets

(56) References Cited

U.S. PATENT DOCUMENTS

| | | |
|---|---|---|
| 7,983,979 B2 | 7/2011 | Holland, IV |
| 7,984,014 B2 | 7/2011 | Song et al. |
| 2003/0120593 A1 | 6/2003 | Bansal et al. |
| 2004/0002958 A1* | 1/2004 | Seshadri ................ H04L 51/24 707/102 |
| 2004/0002972 A1* | 1/2004 | Pather ................... G06F 9/542 707/3 |
| 2004/0002988 A1* | 1/2004 | Seshadri ........... G06F 16/24568 707/102 |
| 2004/0039809 A1 | 2/2004 | Ranous et al. |
| 2005/0004978 A1 | 1/2005 | Reed et al. |
| 2005/0188305 A1* | 8/2005 | Costa ............... G06F 17/30011 715/234 |
| 2005/0257267 A1 | 11/2005 | Williams et al. |
| 2006/0089939 A1* | 4/2006 | Broda .................. G06F 16/252 707/100 |
| 2006/0265508 A1* | 11/2006 | Angel ............... H04L 29/12047 709/230 |
| 2007/0156656 A1* | 7/2007 | Pather ................... G06F 9/542 707/3 |
| 2008/0077462 A1 | 3/2008 | Patel et al. |
| 2010/0095357 A1* | 4/2010 | Willis et al. ..................... 726/6 |
| 2010/0153211 A1 | 6/2010 | Ramer et al. |
| 2010/0182631 A1 | 7/2010 | King et al. |
| 2010/0222029 A1* | 9/2010 | Kamat ................... H04L 51/24 455/412.2 |
| 2010/0241535 A1* | 9/2010 | Nightengale .......... G06Q 20/40 705/30 |
| 2012/0137367 A1* | 5/2012 | Dupont .................. G06F 21/00 726/25 |

OTHER PUBLICATIONS

TNT Software, Event Log Management and Server Monitoring Notification Methods, accessed on Oct. 14, 2010, 4 pages.

United States Patent and Trademark Office, Office Action dated Oct. 23, 2013 for U.S. Appl. No. 12/984,075, filed Jan. 4, 2011, first named inventor Vishal Dilip Khapre, pp. 1-26.

* cited by examiner ably to Gaur et al.# ALERT EVENT PLATFORM

FIELD OF THE INVENTION

The invention generally relates to systems, processes, tools, techniques and strategies for processing business events within a computer system architecture. In various embodiments, the invention more particularly relates to tools for processing and managing alerts associated with business events that occur in association with the computer systems of a corporate entity.

BACKGROUND

Every corporate organization stores and processes data that is important to the needs and objectives of its customers. The organization may employ various kinds of computer systems to process data and other information based on interaction between the customer and the organization as well as business events that impact the customer. For example, business events might include changes that occur in balances of customer accounts held by a financial institution. It is often useful to communicate to herald the occurrence of business events to both customers and management of the organization, such as by using alerts to communicate changes that affect the organization and its customers.

Each line of business of an organization often creates alert communications based on its own specific needs and develops custom computer systems for processing and generating alerts, along with a customized set of protocols for such communications. It can be appreciated that this unfavorably creates operational inefficiencies with respect to sharing information among multiple lines of business. Typically, operating an alert communication system involves interfacing with and modifying the programming of core information systems of the organization to initiate the alerts. Often, conventional alert communication systems must wait for batch-oriented transactions to be processed before alerts can be issued. Many such communication systems do not effectively process or communicate alerts on a real-time basis. Also, conventional alert systems can be inflexible with regard to the limited notification options and other preferences they provide for customers.

In view of the foregoing issues, enhanced tools, techniques and strategies are needed for processing, managing, and communicating alerts and alert information associated with business events that occur within an organization.

BRIEF DESCRIPTION OF THE FIGURES

The utility of the embodiments of the invention will be readily appreciated and understood from consideration of the following description of the embodiments of the invention when viewed in connection with the accompanying drawings, wherein.

DESCRIPTION

Figure 1:
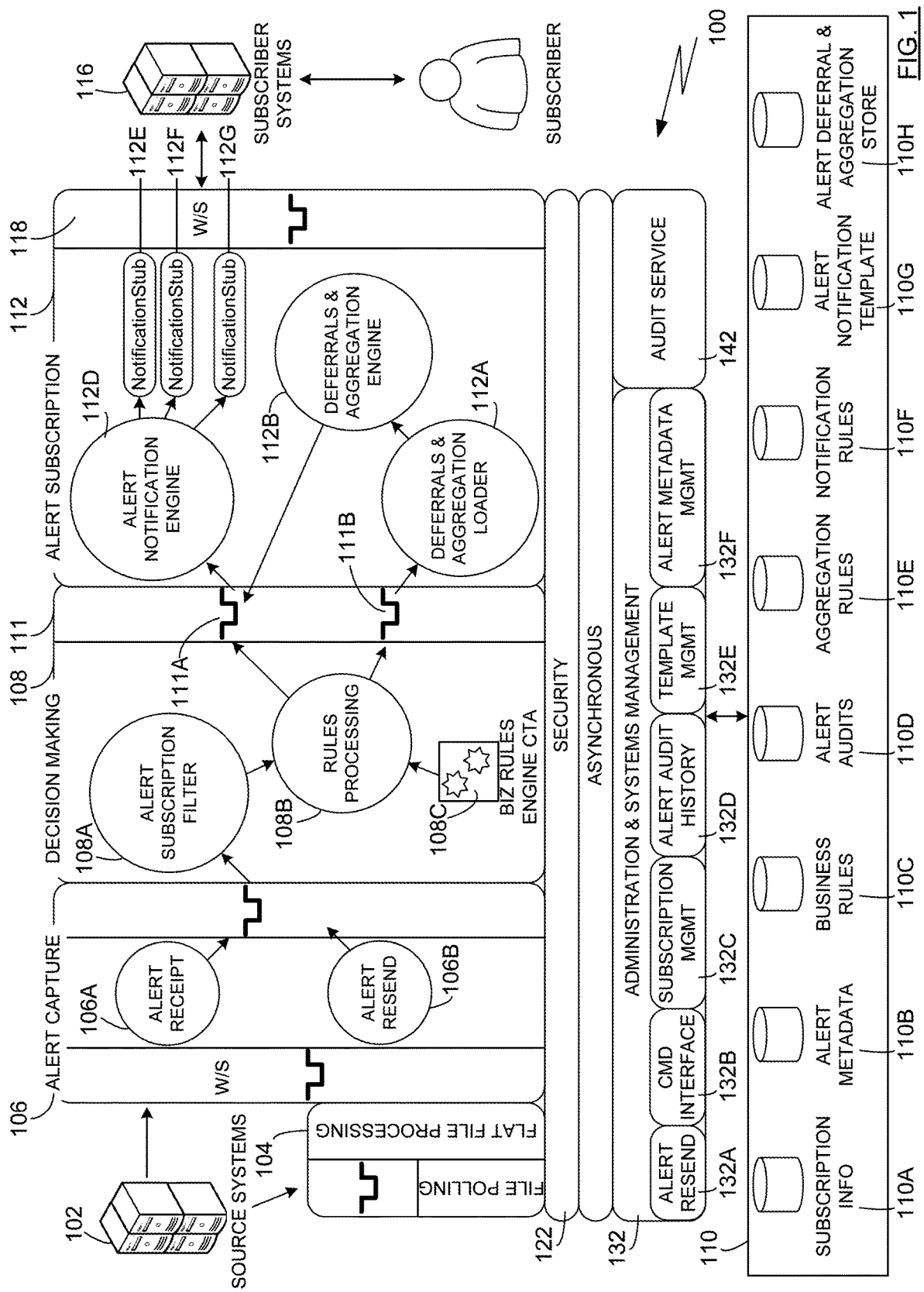
FIG. 1 includes a schematic illustration of examples of a system and process flow provided in accordance with certain embodiments of the invention.
Figure 2:
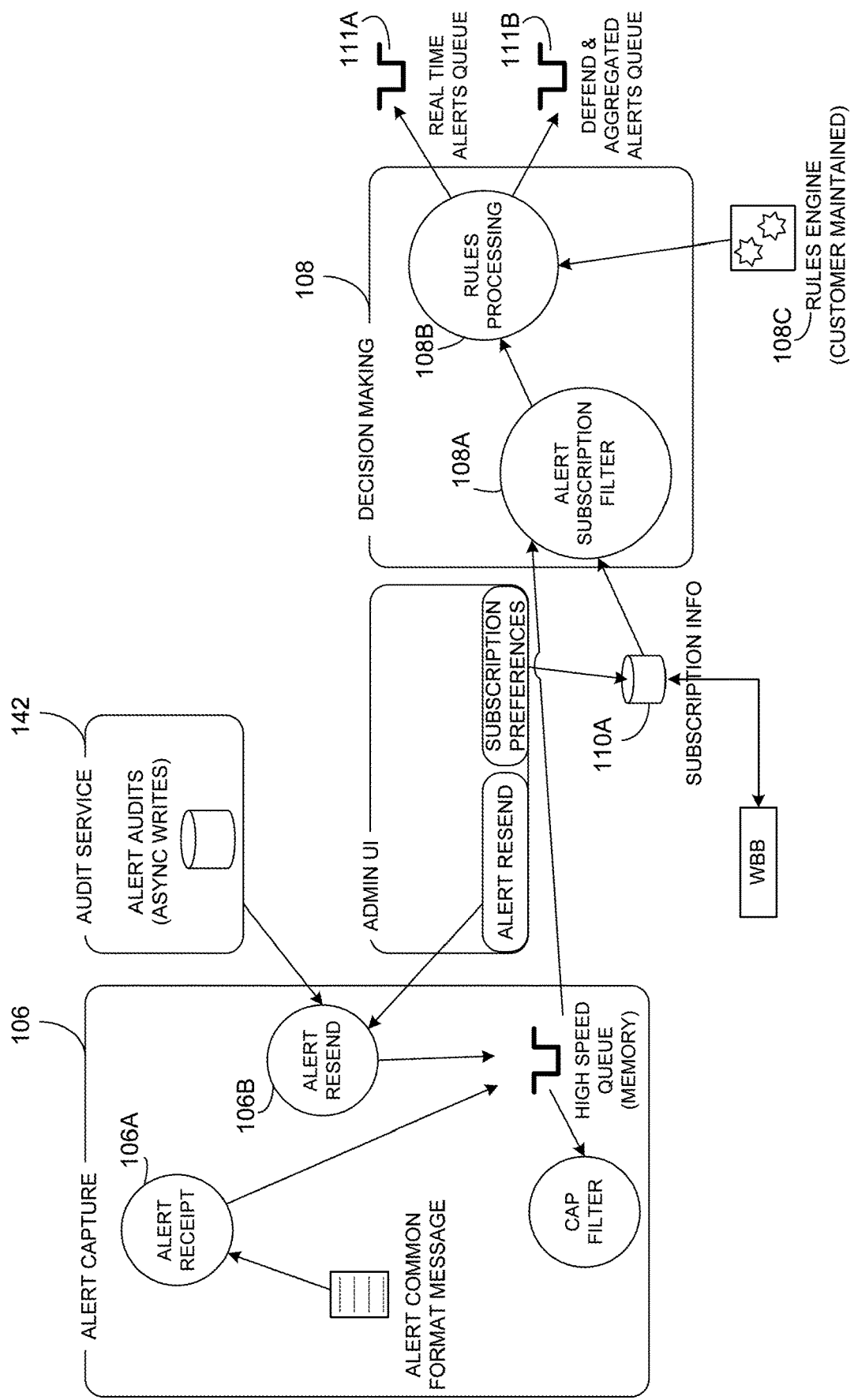
FIG. 2 includes a schematic illustration of examples of modules and components of a system and a process flow provided in accordance with certain embodiments of the invention.
Figure 3:
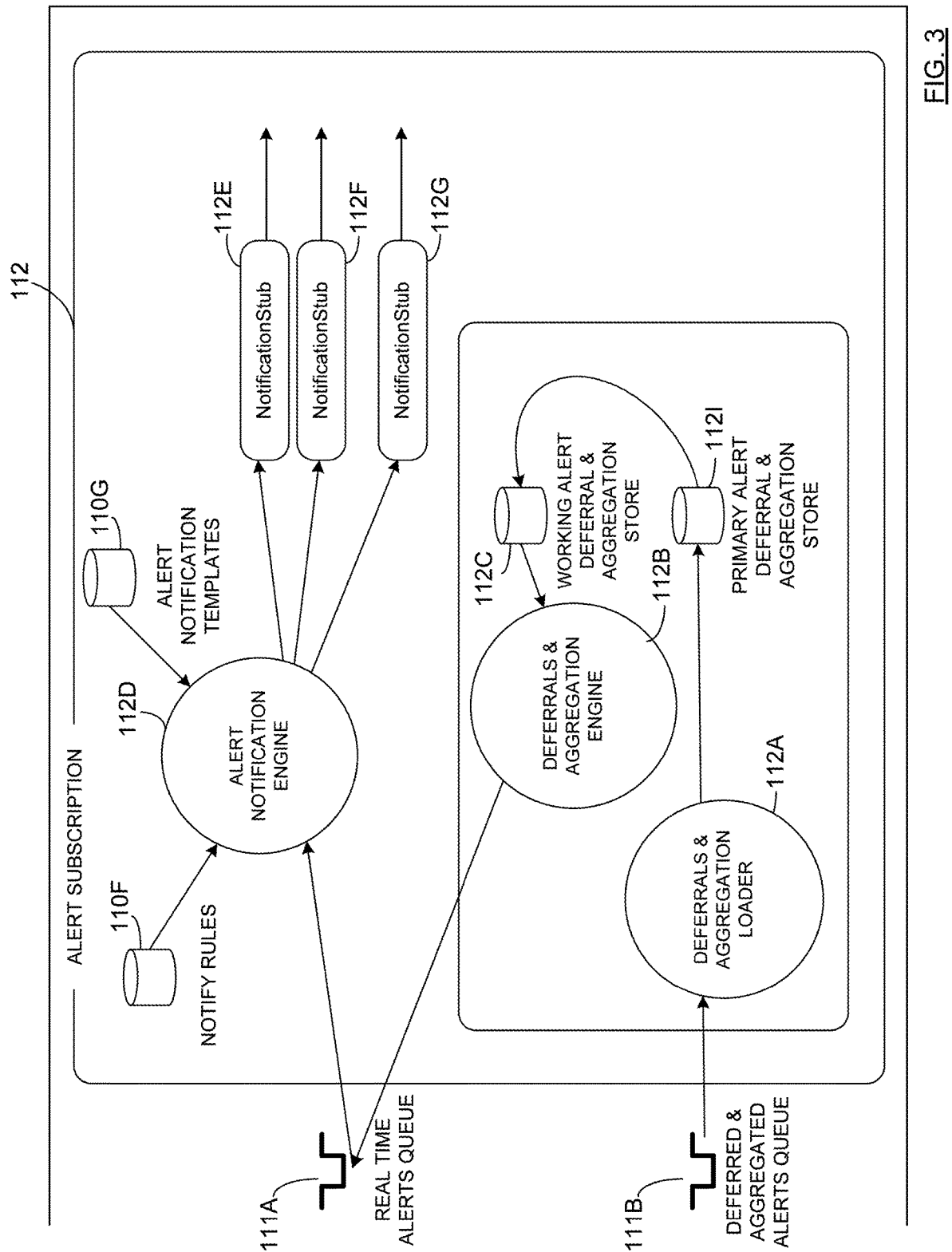
FIG. 3 includes a schematic illustration of examples of modules and components of a system and a process flow provided in accordance with certain embodiments of the invention.
Figure 4:
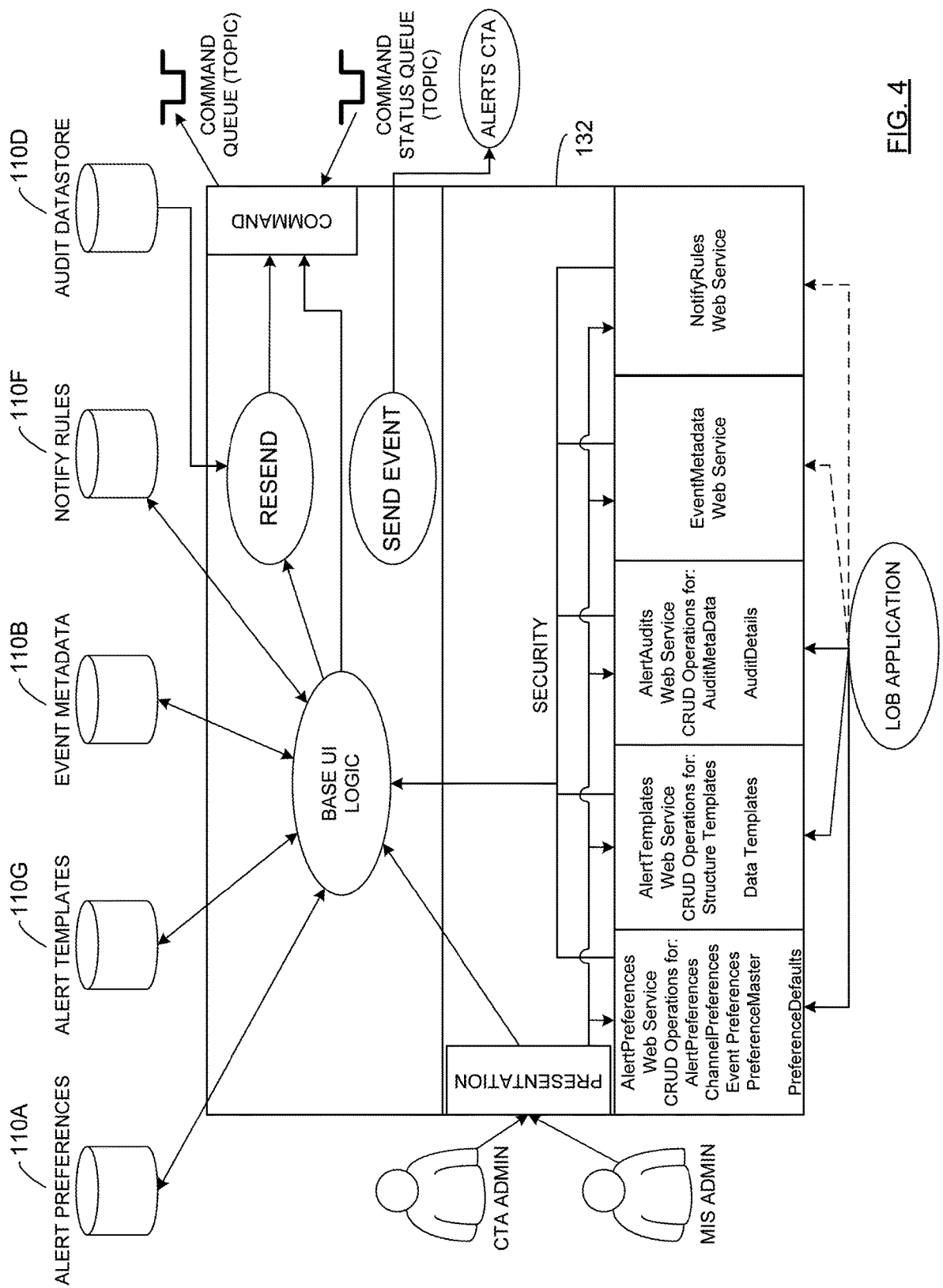
FIG. 4 includes a schematic illustration of examples of modules and components of a system and a process flow provided in accordance with certain embodiments of the invention.

Various embodiments of the invention provide enhanced processes, methods, tools, strategies, and techniques for more effectively and efficiently processing, managing, and communicating alert information related to business events that occur within the computer systems and other information systems of a corporate entity.

In certain embodiments, a system is provided for managing and processing alerts associated with different business events that impact a corporate entity. In various aspects, the system (sometimes referred to herein as "Alerts CTA") may employ an event-driven architecture to process business events and then provide customers and other system users with a mechanism for having have visibility into those business events through a subscription process, for example. Subscribers may be offered the ability to tap into different streams of business events, filter the event streams to obtain information only for events of interest, and then receive alerts associated with the events via one or more communication media or channels. In addition, one or more lines of business of an organization can be provided with the ability to control subscriptions at a higher level: specifying event type specific rules, alert deferral logic, alert aggregation, and alert formatting templates, among other controls. The Alerts CTA system can be configured to own the processing of business events as they transition through the computer systems of the organization. In addition, through an engagement and subscription process, the system can provide a mechanism to implement consumer-specific rules that filter events, as well as auditing and logging events and alerts for the purposes of troubleshooting and business awareness.

In various embodiments, the invention offers each business unit of an organization a technology platform for processing transactions including business events in batch or in real time. The transactions can be filtered by business rules criteria that may be selected by customers and then cross-referenced or combined with other events as they occur throughout the different information systems in the organization. The combined data set can be formatted subject to templates defined by the business unit and then delivered via the preferred communication media or channels (e.g., e-mail, SMS text, voice mail, etc.). A customer can choose to subscribe to those data points or steps predefined and maintained by business units which interact with the customer. It can be appreciated that embodiments of the invention facilitate internal systems or source systems providing data and business event information to the technology platform. The business event information can then be mapped to customer preferences and evaluated against the rules for determining whether an alert should be communicated in accordance with the customer preferences. In certain embodiments, the CTA Alerts system can be programmed to keep historical track of each alert for several purposes including auditing, problem solving, reporting, and various other purpose.

The customer alerting platform offered by embodiments of the invention differs from other solutions in many ways. For example, the system can be programmed with multiple auditing levels, including optional configurations to alter the number of audit points and the amount of detail supplied by audits. The flexibility of the system design is manifested in allowing multiple internal business units to send new alert events, allowing multiple business units to utilize existing events to create new alerts based on existing events and customers for different purposes, and allowing customers to receive alerts related to their data and transactions as the events are processed through various information systems within the organization. The dynamic nature of the system allows platform administrators and potentially line of business administrators with the capability to change run-time configuration without recycling the entire system. In various embodiments, the system can handle relatively high transaction volume by using multiple scaling options, along with handling batch or real-time transaction submissions. The system can be configured to allow users to alter the business rules used to process and filter the business events as needed with little or no assistance (e.g., new software or programming code) from information technology professionals. In various embodiments, alerts can be deferred or aggregated together as deemed appropriate by the line of business user or the customer. For example, users can define standard times that they do not wish to receive alerts (e.g., midnight to 7:00 a.m.), or may define date ranges for suspension of alert notifications (e.g., when on vacation). The platform of the invention may be programmed to handle multiple notification media (e.g., e-mail, SMS text, etc.) with readily available expansion options for additional media identified in the future. Also, lines of business can be permitted to identify events that should be re-submitted to the system, such as for confirmation purposes, and the lines of business may be provided with access to notifications related to auditing or reporting purposes.

With reference to FIGS. 1-4, an example of a system 100 structured in accordance with certain embodiments of the invention may include various operational modules and components. It can be seen that the figures also illustrate examples of certain process flows which the system 100 performs during the processing, generation and delivery of alert notifications. One or more source systems 102 may feed data to the system 100 which includes alert event data among other information. The source systems 102 may represent the core systems of an organization, such as the account and recordkeeping systems of a financial institution, for example. A flat file processing or batch processing module 102 may be included to allow the system 100 to capture alert events in batch format, such as from one or more of the source systems 102. The batch processing module 104 provides the capability to read from a flat file and to separate data records into individual alert events. Each alert event can then be mapped into an alerts common format that is used by the various components of an alert capture module 106 of the system 100. An alert receipt component 106A can be configured for accepting alert events and performing validation and initial processing within the alert capture module 106. Alert events filtered through the alert receipt component 106A may then be transitioned to a decision making module 108 of the system 100 (see below). An alert resend component 106B of the alert capture module 104 may be programmed to accept commands from an administration and systems management module 108 to facilitate rerouting of alert events throughout the system 100, as may be desired.

In the decision making module 108, an alert subscription filter 108A may be included to accept alert events from one or more queues to filter the alert events in parallel for processing efficiency. The alert subscription filter 108A may be programmed to disregard events that are not registered as preferences in one or more of the various data storage media 110 or data stores that may be operatively associated with the system 100. As shown, examples of the data storage media 110 include a subscription information data store 110A, an alert metadata data store 110B, a business rules data store 110C, an alert audits data store 110D, an aggregation rules data store 110E, a notification rules data store 110F, an alert notification templates data store 110G, and an alert deferral and aggregation data store 110H. A rules processing component 108B may be incorporated within the decision making module 108 to receive alert events, combine the alert events with subscription preferences, and then invoke one or more business rules controlled by a business rules engine 108C operatively associated with the decision making module 108.

In various embodiments, the system 100 may also include an alert subscription module 112 programmed for processing alert events to generate and communicate alert notifications. Within the alert subscription module 112, a deferrals and aggregation loader 112A may be programmed to receive alert events from the rules processing component 108B that have been determined to be applicable to one or more deferral and/or aggregation processes. A deferrals and aggregation engine 112B may be provided as the main processing engine for processing alert events that require deferral and/or aggregation services. The engine 112B can be configured to identify new events in a working data store storage medium 112C, group the identified events with like events as appropriate, and then publish the events to an alert queue prior to notification. An alert notification engine 112D of the alert subscription module 112 can be programmed for routing alert notifications based on alert events to various subscriber systems 116 based on subscription decisions made by the rules processing component 108B and the deferrals and aggregation engine 112B, for example. Alert notifications may be communicated to one or more subscriber systems 116 via one or more alert notification queues 118. One or more notification stubs 112E-112G may be used by the alert subscription module 112 to store service specific knowledge for delivery of the alert notifications via different communication media or channels. For example, e-mail delivery specific knowledge may be stored in one of the notification stubs 112E-112G, and SMS text delivery specific knowledge may be stored in another one of the notification stubs 112E-112G. The notification stubs 112E-112G may be configured to execute delivery of the alert notifications to the alert notification queues 118.

In various embodiments, a security module 122 can be provided to promote security for entry points into the system 100 (e.g., MQ/JMS and WebService), such as by securing access with a password scheme. In addition, each source system 102 may employ its own separate password combination for auditing purposes, among other reasons. The security module 122 may be configured for promoting receipt of inbound messages to the system 100 in conformance with a predetermined alert event contract or specification. In addition, to promote further security within the system 100, event identifiers, alert identifiers, and delivery identifiers may be configured to be unique. With respect to the various databases 110, data stores with different information sensitivity (e.g., audit, preferences, and metadata) may be stored in separate schemas and/or different databases and may be accessed with different passwords.

An administration and systems management module 132 may be included in the system 100 in various embodiments of the invention. The administration and systems management module 132 may be programmed to facilitate support implemented by support personnel through a web-based administrative console, for example, enabling the support personnel members to control and modify various components of the system 100. Examples of components included within the administration and systems management module 132 include an alert resend component 132A, a command interface 132B, a subscription management component 132C, an alert audit history component 132D, a template management component 132E, and an alert metadata management component 132F.

A logging and auditing module or audit service 142 may be included in the system 100 in various embodiments. The logging and auditing module 142 may provide a service for tracking data transactions and auditing various facilities for the system 100. For example, messages may be passed to the logging and auditing module 142 at different points in the processing of the alert events and alert notifications as they move through the system 100. Some of these messages may be indicative of optional audits and others may be indicative of required audits. It can be appreciated that the logging and auditing module 142 can be programmed to supply troubleshooting information to the support groups of an organization to trace the efficiency and effectiveness of specific events and transactions within the system 100. In addition, different lines of business or business units of the organization can utilize audit information associated with business events and alert notifications to determine key metrics related to their business processes.

With reference again to FIGS. 1-4, as inputs to the main processing performed by the system 100, publisher systems or source systems 102 send data and other information associated with business events and alert events to the system 100. These business events have metadata, rules, subscriptions and other attributes defined for them such that when they are processed, subscribers can receive formatted alert notifications via the protocol or communication channel of choice. In various embodiments, the business events are configured as individual data records of business events that are formatted in an alert common format message. As noted above, the business events and alert events can be processed as individual data records derived from real-time activity occurring within the source systems, or as a part of batch data transactions.

As an output to the processing performed by the system 100, subscriber systems 116 can communicate alert notifications associated with the business event information from the system 100 to subscribers in the format or by the delivery method chosen by the subscribers. In various embodiments, the subscriber systems 116 may be externally operative with respect to the system 100. Communication protocols for the subscriber systems 116 may be configured in the notification stubs 112E-112G as services via async or sync protocols, for example.

The batch processing module 104 allows the system 100 to capture business event and alert event information in batch format. The batch processing module 104 can be programmed to read from a flat file and separate data records into individual alert event records. Data associated with each alert event can be mapped into an alerts common format that can be read and processed by the alert capture module 106. In certain embodiments, the system 100 may use Informatica CTA for batch processing requirements, for example. Fixed format flat files may be handled in ASCII or Unicode encoding. Flat files may be received via MQ, and may involve a file drop from NDM or FTP protocols, for example. The batch processing module 104 may be configured to identify the sender by file name, directory of drop, and/or a file or record format. The module 104 can leverage a configurable flat file schema for extensibility and may archive processed files or error files. Also, the module 104 may be configured to process only incoming records with valid record format, and to process each record in a file separately so that only invalid records are logged. However, file processing within the module 104 may not be halted due to the presence of individual invalid records. In addition, the module 104 may be configured to publish each record as a unique business event to one or more queues associated with the alert capture module 106.

In various embodiments, the system 100 may employ certain inbound protocols for enabling the source systems 102 and the batch processing module 104 to communicate data to the alert receipt component 106A of the alert capture module 106. Such inbound protocols allow the modules and components of the system 100 to communicate in the alerts common format with respect to efficiency choices. An interface may be configured to initially expose only web services for synchronous and Websphere MQ for an async communication layer. WS-Security/SSL based protocols may be used for Web Services applications, and/or MCA User based security protocols may be used for MQ communication. All communications may be configured to use XML-based data formats, and to use the alerts common format as the communication format. The system 100 may be configured to not validate the alert event structure data at this inbound protocol layer. Also, MCA user identifiers or WS-Security user identifiers can be used to identify the source systems 102, for example. Formatted alert events may be output from this layer to an appropriate queue 106 associated with the alert receipt component 106A. In certain embodiments, these inbound protocols may be configured to respond to commands received from the administration and systems management module 132.

The alert receipt component 106A may be programmed to filter messages in accordance with the alert metadata database 110B. For example, alert events with an event type not defined in the alert metadata database 110B may be logged (e.g., such as in accordance with a full audit) and then disregarded. In certain embodiments, the alert receipt component 106A may also determine quality of service (QoS) requirements from associated entries in the metadata database 110B, or other event header priorities, in accordance with an event type identifier. The message structure of the communicated alert event may be verified, such as by mapping a "LangTypeForBizObject" element from the alert metadata database 110B to the alert event message, for example. The alert receipt component 106A may also be programmed to verify that an event identifier exists in the alert event data, and to populate the event identifier as necessary. The alert receipt component 106A may be programmed to place processed alert event messages onto an appropriate QoS queue, for example, for further decisioning and processing by the system 100. In certain embodiments, information from the metadata database 110B can be cached into a singleton and referenced real-time from that singleton for performance. Information derived from the singleton can be refreshed periodically in accordance with a runtime configurable parameter. Message structure verification performed by the alert receipt component 106A can be executed using the "LangTypeForBizObject" element associated with the event version type of the alert event, as it falls in between the start time and end time associated with the event. Data elements associated with the alert event at this stage of processing may include, for example: event type, event description, start time, end time, quality of service, LangTypeForBizObject, and version. Data transactions processed by the alert receipt component 106A can be logged and stored by the audit service 142.

In various embodiments, the alert resend component 106B facilitates rerouting and resubmitting alert events throughout the system 100. The alert resend component 106B may use a unique alert event identifier to identify the correct event, and may not necessarily assign new identifiers to the resubmitted events, so that the new resubmission is identified as resubmit from the alert audit database 110D. In a full audit mode, a log message can be generated and stored to identify resubmissions executed by the system 100. In certain embodiments, the alert resend component 106B can query the alert receipt component 106A and/or audit records from the audit database 110D to construct an alert event in the alert common format for each event identifier. The collection of resubmitted alert events can be communicated to the QoS decision making queue, for example, prior to resubmission. In certain embodiments, the alert resend component 106B can be configured to accept commands from the administration and systems management module 132.

In various embodiments, several different kinds of queues may be used by the system 100 to process alert events. Decision making queues can be programmed to accept and position business event messages subject to the QoS status (e.g., priority) required for the messages, for example. In certain embodiments, alert subscription queues may be configured to accept and place business events subject to whether the message requires additional processing for deferral or aggregation with other alert events. Alert events placed on the real time queues may be pulled by the alert notification engine 112D, for example. Likewise, alert events placed on the deferral and aggregation queues can be pulled by the deferrals and aggregation loader 112A.

The alert subscription filter 108A may be configured to accept and filter alert events communicated from one or more decision making queues. The subscription filter 108A may be responsible for filtering out events that are not registered in an alert preferences database, such as the subscription information database 110A. The alert preferences database 110A may contain customer-defined information, for example, related to alert events that are of significance for rule processing. In operation, the subscription filter 108A may be configured to pull the alert event from the alert subscription queue and match the alert event to corresponding entries in the alert preferences database 110A. The alert event and subscription preferences may be passed to the rules processing component 108B. In certain embodiments, the number of threads pulling alert events from queues operatively associated with the decision making module 108 may be run-time configuration based on QoS, for example. Examples of data elements accessed by the alert subscription filter 108A may include: in a PreferenceMaster table—EventType, PrefProvider, AppKey1-5, PreferenceID, SuspendStartDT, SuspendEndDT, CreatedDT, CreatedBy, ModifiedDT, and ModifiedBy; in a PreferenceLinks Table—PreferenceID, EventPrefID, and ChannelPrefID; in an EventPreferences table—OperatorID, EventPrefID, LeftExpression, Operator, RightExpression, and SequenceNum; in a ChannelPreferences table—ChannelPrefID, ChannelType, DNDStartTime, DNDEndTime, ChannelSeqID, Address, and ContactInfo (XML); and, in a DefaultPreferences table—PreferenceProvider, EventType, ChannelType, Name, and Value. The alert subscription filter 108A receives various alert events in alerts common format from the decision making queues. The subscription filter 108A then outputs the alert events of processing significance to the rules processing component 108B. The alert subscription filter 108A can be configured to take action and respond to commands supplied from the administration and systems management module 132.

The rules processing component 108B may be configured to accept alert event data, combine the alert event data with one or more subscription preferences, and then call the rules maintained in the business rules engine 108C. In various embodiments, the rules processing component 108B may be configured to receive alert event data from the alert subscription filter 108A, for example. In combining the alert event data with alert subscription preferences, the rules processing component 108B may add the preferences to the body of the alert event message. In operation, a single interface for all event types (e.g., MQ/JMS or WebService) may be provided for calling the business rules engine 108C. The rules engine 108C can be programmed to evaluate customer-defined rules against the alert event data and data derived from the alert subscription filter 108A. The rules engine 108C can then return a "RuleResults" array to the rules processing component 108B, and data from the RuleResults array can be inserted into the body of the alert event message. In certain embodiments, a unique alert identifier can be assigned to each new alert event. Also, the data may be separated into multiple alert events, one for each RuleResults array and also one for each ChannelResult for the alert event data. Each alert event can be sent to one or more alert subscription queues. If a "CustomerNotify" variable has a false condition, then a real time alerts queue 111A can be used, otherwise a deferred and aggregated alerts queue 111B can be used. New alert events bound for the real time alert subscription queues 111A may be placed in an alert packet wrapper, and a unique delivery identifier may be assigned for each alert packet. New alert events bound for the deferral and aggregation queue 111B may be placed in as-is condition. In various embodiments, users can customize and create the rules stored on the business rules engine 108C. It can be seen that alert events configured for immediate processing can be communicated to the real time queue 111A and alert events having metadata for deferred processing can be communicated to the deferral and aggregation queue 111B. Among other components within the decision making module 108, the alert subscription filter 108A can be programmed to take action and respond to commands as given by the administration and systems management module 132.

The deferrals and aggregation loader 112A may be configured to accept alert events from the rules processing component 108B that have been determined to require deferral and/or aggregation processing. The loader 112A may receive alert events from the alert subscription queue 111B which contain the raw alert event data, as well as data output from the rules processing component 108B. The loader 112A may be configured to calculate absolute times of delivery for the received alert events and/or store them in one or more alert deferral and aggregation data stores 112C, 112. The loader 112A may also be programmed to generate an aggregation key for alert event data (e.g., AggregationKey=<group>+<key> in business rules engine 108C; and then combine EventType+ChannelSeqID+PrefProvider+AggregationKey). As noted above, users can be permitted to create rules on the business rules engine 108C that can be used to determine if the alert event is eligible for deferral based on customer preferences. The business rules may also contain an indication of eligibility of the alert event for aggregation with other events. A trigger may be provided to automatically copy data to a working table (i.e., a working database 112C) from which the deferrals and aggregation engine 112B can draw working data. A primary deferral and aggregation table may be stored on a separate database (i.e., a primary database 112) as an unaltered copy of the data with little or no indexing, and potentially no updates, deletions, or other modifications. The deferral and aggregation table may include the following fields, for example: AlertID, AggregationKey, MustGoDatetime, MustWaitDatetime, and AlertEvent (CLOB).

The deferrals and aggregation engine 112B may be configured as the main processing engine for alert events that require deferral and/or aggregation processing. The engine 112B can be programmed to identify new events as they expire in the working data store 112C, group them with like events where appropriate, and then publish the event data to the real time alerts queue for communication of alert notifications. In certain embodiments, the engine 112B may compare a delivery date versus a system date to identify alert events for notification as they expire from the working data store 112C. The engine 112B may sort data by AggregationKey and then by DeliveryDate to identify and group related events into an ordered list of alert events. The ordered list of alert events may be inserted into an alert packet, which may have a unique delivery identifier. The alert packet may then be published or communicated to the real time alerts queue 111A. Processed alert events may then be deleted from the working data store 112C. In various embodiments, the aggregation process may be performed only for alert events having the same event type designation. Data tables in the primary store 112I and the working store 112C may include the following data elements, for example: AlertID, AggregationKey, MustGoDatetime, MustWaitDatetime, and AlertEvent (CLOB). A trigger may be provided in the primary store 112I to automatically copy data to a working table in the working database 112C as the alert events are committed. Aggregated or deferred alert events can be placed on the real time alert queue 111A.

The alert notification engine 112D may be programmed to route alert events to appropriate systems based on subscription decisions made by the rules processing component 108B and the deferrals and aggregation engine 112B using the alert notification queue. The notification engine 112D may compute routing paths for each alert event based on decisions received from the rules processing component. The notification engine 112D may query one or more notification templates in the alert notification template database 110G, for example, and then package the alert event for notification before calling one or more appropriate notification stubs 112E-112G. In various embodiments, the alert events may be packaged with a unique delivery identifier and pass the delivery structure to the notification stubs 112E-112G. The notification engine 112D may also send a log message to the alert audit data store 110D to update the delivery identifier. In certain embodiments, each aggregated event may receive a separate full audit. Notification rules and information in the alert templates data store 110G may be cached into singletons and referenced real-time from those singletons for performance. Examples of data elements that may be included in an alert notification rules table include the following: PreferenceProvider, ChannelType, Property, and Value Alert. Examples of data elements that may be included in a structure templates table include the following: TemplateID, PrefProvider, ChannelType, TemplateType, and Template. Examples of data elements that may be included in a DataTemplates table include the following: TemplateID, PrefProvider, ChannelType, EventType, and Template. Data input to the notification engine 112D may include the array structure including the alert events designated for delivery as single packet. Data output from the notifications engine includes the array structure of the alert events delivery packet and the notification template to the notification stubs.

The administration and systems management module 132 enables support members of the organization to control and make changes to various modules, components, and operational aspects of the system 100. The administration and systems management module 132 can be configured to query and resend alert events, stop and start component execution, and obtain and display component-level status, among other functions. Communications to the components of the system 100 can be conveyed via a topic message queue. Responses from the system 100 components can be conveyed to a web administrative console, for example, via a separate topic message queue. Among other components, the administration and systems management module 132 may have at least two primary components, including a system status component and a systems management component. Functionality of the system status component may maintain in-memory status from each component of the system 100 infrastructure and may be dynamic to scale with new instances of components as might be introduced for scaling purposes. The system status component may be configured to update status periodically and/or automatically. The system status component may obtain status information and updates via a run-time configuration parameter, for example. The systems management component may be configured to allow higher privileged users (e.g., by role) to interact with the system 100 components, requesting status information updates and other configurable actions. Actions may be run-time configurable per component and available based upon the state of the system 100. For example, if a component is listening, then a "start listener" option should not be made available to a user. As described above, with respect to the alert resend component 106B of the decision making module 106, the administration and systems management module 132 may be configured for searching full audits from processing involving the alert receipt component 106A. In addition, users with high privileges (e.g., by role) can be offered the ability to select alert events from audit search results for reprocessing through the system 100. For example, alert events can be submitted by using an action message in connection with the alert resend component 106B.

Figure 5:
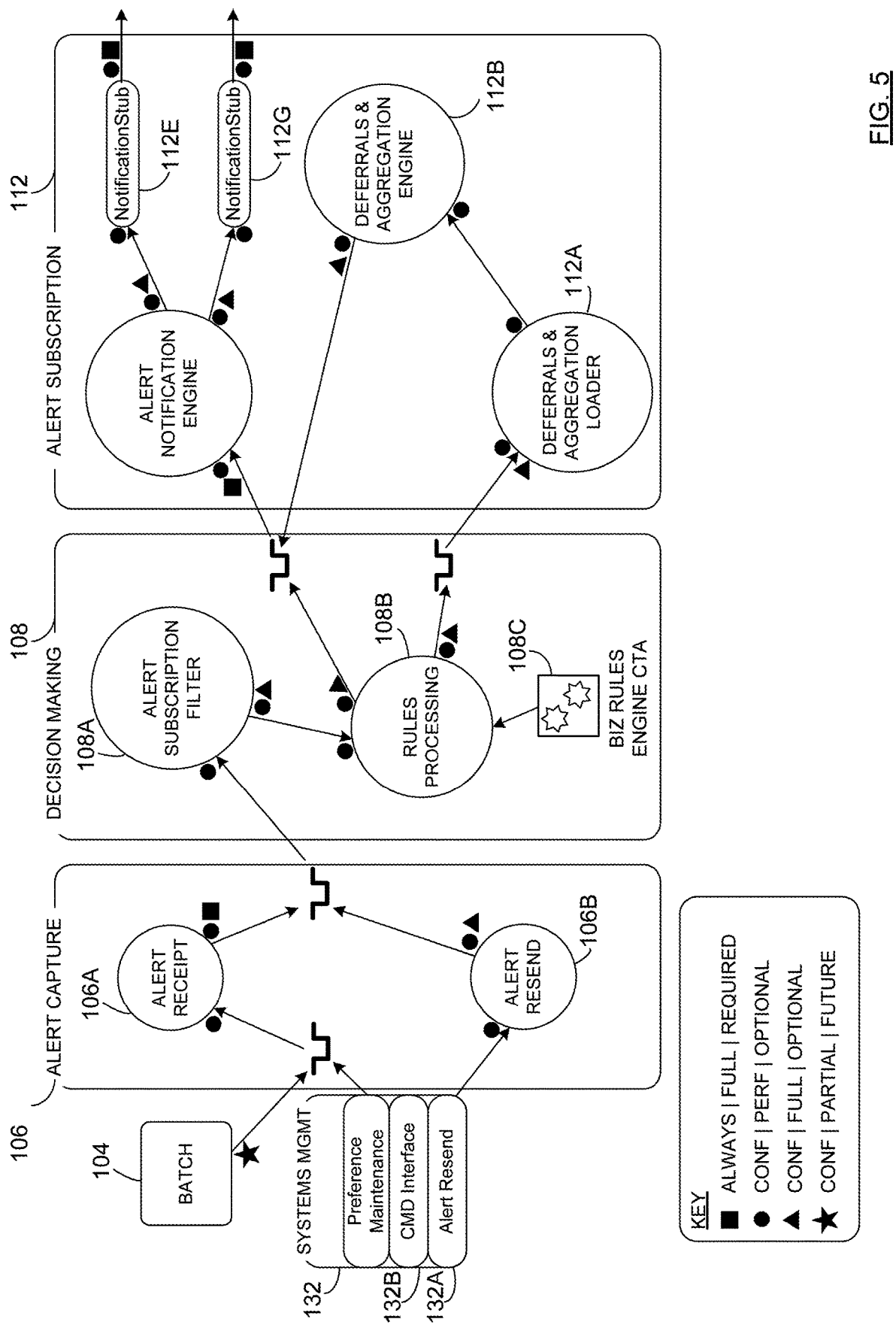
FIG. 5 includes a schematic illustration of examples of modules and components of a system and an audit process flow provided in accordance with certain embodiments of the invention.
Figure 6:
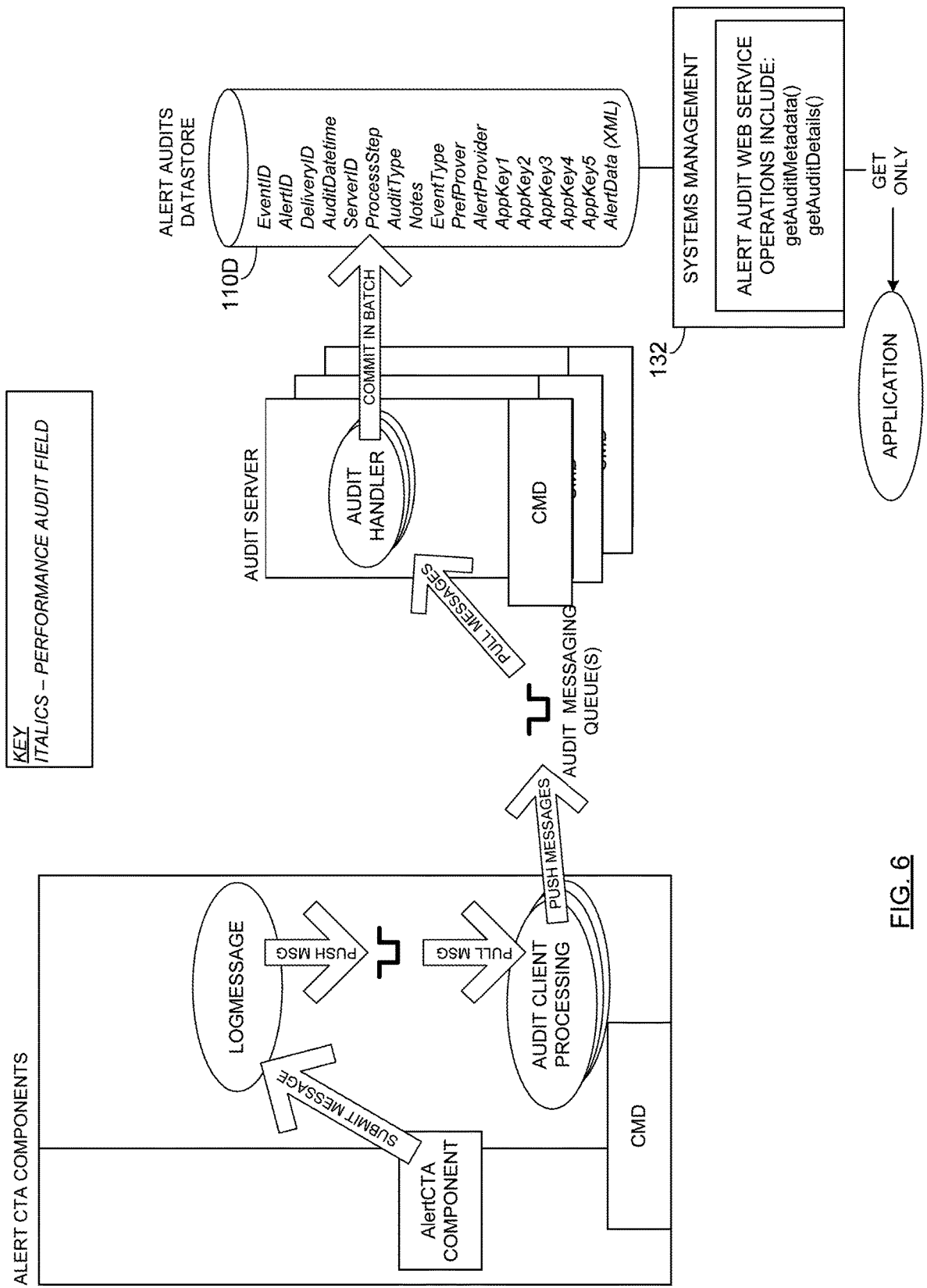
FIG. 6 includes a schematic illustration of examples of modules and components of a system and an audit process flow provided in accordance with certain embodiments of the invention; and, FIG. 7 includes a schematic illustration of examples of modules and components of a system and an alert customization process flow provided in accordance with certain embodiments of the invention.

The logging and audit module or audit service 142 can be configured as the primary tracing and auditing facility for the system 100. At least three types of messages may be defined for communication to the audit service 142. A full audit may include all information related to the alert event including metadata. In the case of an error occurring during system 100 processing, a full audit typically would contain sufficient information to troubleshoot the problem. Full audits can be transmitted for each event as it leaves certain major functional processing points within the system 100. A performance audit may be designed to contain only enough information to trace an event for performance/SLA tracking. Performance audits can be transmitted for each event as it enters and leaves certain major functional process points within the system 100. A system message involves errors and messages that are system 100 level (i.e., not specific to a line of business or particular alert event), and they can be sent as needed to an application log file of the audit service 142. A client associated with the audit service 142 can determine if a message is an audit type of message or a system message. In certain embodiments, system messages can be routed to a Log4j subsystem and audit messages can be placed on an internal concurrent in-memory queue. The queue can be monitored by a threaded system which can determine the type of audit the message involves and filter based on run-time data to match (e.g., severity). Audit messages may be grouped by type (e.g., size of group determined by run-time configuration data), serialized and sent to a JMS/MQ system, for example, for processing by the audit service 142. The audit service 142 may monitor the JMS/MQ queue, import the audit messages, and then deserialize and group the messages (e.g., size of group determined by run-time configuration data) for batch insert into the appropriate audit database. Examples of data elements that may be used in association with performance alerts include the following: DeliveryID, AlertID, EventID, DateTimeStamp, ProcessStep, ServerID, and NotesAsProperties. Examples of data elements that may be used in association with an alert audits table include the following: EventID, AlertID, DeliveryID, AuditDatetime, ServerID, ProcessStep, AuditType, Notes, EventType, PrefProvider, AlertProvider, and AlertData (XML). FIGS. 5 and 6 include examples of an audit design including various audits that may be performed within the system 100.

Figure 7:
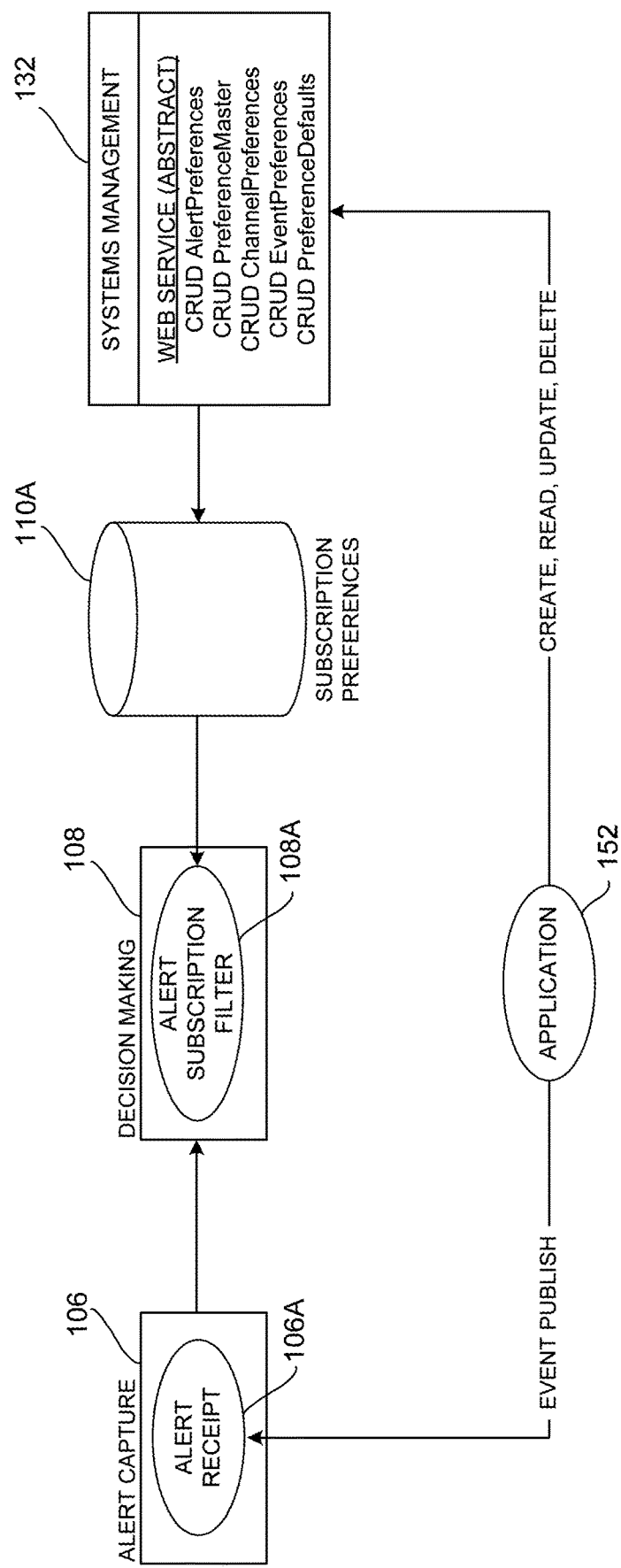

With reference to FIG. 7, a preferences interface 152 may be provided as an application that enables and performs CRUD (create, read, update, and delete) operations within the system 100 and its modules and components. The preferences interface 152 may include a user interface application having business-specific fields and organization for receiving preference data from a user. The preferences interface 152 may include a WebService for sending CRUD changes as specified by the user and may stage/store preference information for use by the system 100. After confirmation of successful staging/storing of preferences, the preferences interface application 152 may send security alerts. Also, within a predetermined time frame, the caches of subscription preferences as used by the alert subscription filter 108A can be updated with current preference settings. Examples of operations accessed by the preferences interface 152 include the following: PreferenceMaster, EventPreference, ChannelPreference, and DefaultPreference. Examples of data elements used by a PreferenceMaster table in the subscription preferences database 110A include EventType, PrefProvider, AppKey1-5, PreferenceID, SuspendStartDT, SuspendEndDT, CreatedDT, CreatedBy, ModifiedDT, and ModifiedBy. Examples of data elements used by a PreferenceLinks table in the subscription preferences database 110A include PreferenceID, EventPrefID, and ChannelPrefID. Examples of data elements used by an EventPreferences table in the subscription preferences database 110A include OperationID, EventPrefID, LeftExpression, Operator, RightExpression, and SequenceNum. Examples of data elements used by a ChannelPreferences table in the subscription preferences database 110A include ChannelPrefID, ChannelType, DNDStartTime, DNDEndTime, ChannelSeqID, Address, and ContactInfo (XML). Examples of data elements used by a DefaultPreferences table in the subscription preferences database 110A include PreferenceProvider, EventType, ChannelType, Name, and Value.

Embodiments of the invention may be used in a variety of different operational environments. For example, in the context of retail banking, a user may log into an online banking application and access a number of accounts. The user decides to sign up for alerts for one or more of the accounts, passing through a sequence of screens that allows the user customize an alert process based on the event types supported by the online banking application, For example, the user might choose to receive e-mail messages whenever a withdrawal transaction over $500 occurs for the user's checking account as an alert event. The e-mail notification may be specified for a personal e-mail account, as well as a work e-mail account. Every time the system 100 identifies this alert event, and it confirms that he user has subscription preferences tied to that alert event, then it would send the e-mails as alert notifications tied to that alert event. And this can happen either in real time as the event happens, or it can happen in batch, such as when transactions associated with the user for that day are accumulated and communicated through the system perhaps the following morning or afternoon or another later time. In addition, other user accounts could be involved in the alert event and alert notification process, such as credit card accounts, savings accounts, investment accounts, and many others. The system 100 maintains the subscription preferences chosen by the user, processes the alert event in real time or in batch, ascertains whether the alert events are supported by the system 100, and matches the alert events with the subscription preferences provided via the online banking application. For example, the customer can decide not to receive a certain alert notification during certain time periods, such as when the customer is on vacation. In another example, the customer can choose not to receive alert notifications between 10:00 p.m. and 6:00 a.m. of a certain day or days. In another example, customer data may be shared among different customers. One banking account might be shared between two spouses, for example, and both spouses can define their own preferences on how to receive alert notifications for the account. One spouse might want to be notified if a withdrawal on the account is more than $100; the other spouse might want to be notified of any withdrawal larger than $200.

Embodiments of the system 100 may also provide the line of business of an organization to customize desired business logic for alert events and communicating alert notifications. For example, a user may configure a subscription preference to generate an alert notification if a deposit is over $500, but the organization decides that the deposit has to be over $1,000 to warrant an alert. The system 100 can enable the organization to potentially override preferences, create additional preferences, or create additional scoping logic to either increase or reduce the number or type of alert notifications. For example, certain lines of business may want to receive online banking alerts regarding deposits of more than $1,000, because they want to tell the customer about a special rate for a certificate of deposit. Also, a line of business might decide that if there are 20 withdrawals that happen in a customer account during a given day, it might not want to send 20 different alerts to the customer that day but instead aggregate the alerts and send them at 4:00 p.m. It can be seen that the system 100 can facilitate employees taking action on business events, and the business of the organization can be enhanced by potentially selling more products or services to the customer.

The benefits of practicing various embodiments of the invention can be readily appreciated. The invention can provide an interface into core systems of an organization for customizing alert preferences and generating alerts without significant modifications to the programming code of those core systems. Real time alerts can be generated as business events of interest occur without necessarily waiting for batch transactions to become available. As a comprehensive approach, various embodiments of the invention allow users to "listen" to almost every business event that within the core systems of the organization. Line of businesses can monitor events and identify potential business opportunities without affecting the operation of the core systems. In addition, by storing records and performing audits of business events that occur within the core system, further operational analyses are made possible for each line of business of the organization. Also, embodiments of the invention provide ways for customers to define alert preferences in conjunction with a business engine that allows the organization to interpret those preferences and inject its own preferences. Another feature of the system is that it may be configured to keep track of almost every alert that goes out of the organization, which allows the organization to respond to inquiries from customers about alerts they have received and to review alert histories for individual customers. The system is also flexible enough to understand the load of alert events and alert notifications that are being processed through the system so appropriate adjustments can be made as necessary. Various embodiments of the system have the flexibility to rapidly expand or decrease the load without making any significant changes to core systems of the organization.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the computer systems, data storage media, or modules described herein may be configured and/or programmed to include one or more of the above-described electronic, computer-based elements and components, or computer architecture. For example, the wave assignment system or the wave assignment database may employ such components or architecture. Also, it is contemplated that various users of the assessment construction system may interact or communicate with the system in a variety of ways. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A computer-implemented method for processing alert event information, the method comprising:
  receiving, by a computing system comprising an electronic computer processor and a non-transitory data storage media, event data, including alert event data, from one or more source systems and storing the data in the data storage media, wherein receiving the event data is performed by a batch processing module capable of reading from a flat file and separating data records into individual alert events, wherein the flat file comprises a configurable flat file schema;

processing, with the electronic computer processor, batch transactions including alert events and real-time transactions including alert events;

accepting alert events and performing validation of the alert events by an alert capture module, including mapping each alert event into an alert common format for use by multiple modules and components of the computing system;

matching, by the electronic computer processor, the alert events with one or more corresponding subscription preferences stored in an alert preferences database operatively associated with a decision making module;

combining, by the electronic computer processor, the alert events with the subscription preferences, wherein the subscription preferences are added to the alert events and the decision making module includes an alert subscription filter to accept alert events from one or more queues to filter the alert events in parallel;

invoking, by the electronic computer processor, one or more business rules in association with the alert events and the subscription preferences with a business rules engine, the one or more business rules including a notification rule for generating a query of one or more notification templates from an alert notification template database and for generating a routing path from a notification engine for routing alert notifications;

assigning a unique alert identifier to each new alert event and caching information related to the one or more business rules and the alert events into a singleton;

determining, by the electronic computer processor, whether the unique alert identifier corresponds to an aggregation key identifier;

upon determining that the unique alert identifier corresponds to an aggregation key identifier:
  filtering alert event data by the aggregation key identifier and by a delivery date for grouping related alert events into an ordered list;
  designating at least one alert event for deferred processing;
  calculating a time of delivery for the at least one designated alert event for deferred processing; and
  communicating, by the electronic computer processor, the alert events designated for deferred processing to a deferral and aggregation queue;

upon determining that the unique alert identifier does not correspond to an aggregation key identifier:
  designating at least one alert event for immediate processing;
  communicating, by the electronic computer processor, the alert events designated for immediate processing to a real time queue; and
  communicating at least one of the alert events designated for deferred processing in the deferral and aggregation queue to the real time queue after the calculated time of delivery;

copying, with the electronic computer processor, alert event data to a working table of the non-transitory data storage media, and drawing the alert event data from the working table as the alert events are committed to the real time queue for immediate processing, wherein the alert event data is referenced in real-time from the singleton, wherein the alert data is deleted from the working table after being processed;

routing, by the electronic computer processor, alert notifications to one or more subscriber systems according to the alert events in the real time queue based on one or more subscription decisions made by invoking the business rules;

delivering, by the electronic computer processor, the alert notifications in accordance with at least one communication channel, wherein a notification stub stores service specific knowledge for delivery of the alert notifications associated with an individual communication channel;

receiving, by the electronic computer processor and via a preferences interface, the subscription preferences data from a user and at least perform one of stage and store the subscription preferences data for implementation by the computing system;

receiving, by the electronic computer processor and via a web-based administrative console, control and modification information from a user for implementation by the computing system to control and modify components of the computing system;

associating, by the electronic computer processor and via a security module, each unique alert identifier with a password scheme, wherein data stores with different information sensitivity are stored in different databases and are accessible with different passwords; and performing, by the electronic computer processor, a full audit including all information related to a selected alert event including metadata as processed through predetermined functional processing points.

2. The method of claim 1, further comprising filtering, by the electronic computer processor, alert event messages in accordance with an alert metadata database.

3. The method of claim 2, further comprising logging and disregarding, by the electronic computer processor, alert events having an event type not defined in the alert metadata database.

4. The method of claim 1, further comprising determining, by the electronic computer processor, quality of service requirements from associated entries in a metadata database in accordance with an event type identifier for the alert event.

5. The method of claim 1, further comprising querying, by the electronic computer processor, one or more records of an audit database in association with constructing an alert event based on the unique alert identifier for resubmission through an alert resend component.

6. The method of claim 5, further comprising rerouting an alert notification according to the alert event constructed for resubmission based on the unique alert identifier and generating a log message that identifies the rerouted alert notification.

7. The method of claim 1, further comprising altering, by the electronic computer processor, a number of audit points and an amount of detail supplied by audits.

8. The method of claim 1, wherein the subscription preferences include at least one date or time when a subscriber does not want to receive the alert events.

9. The method of claim 1, further comprising verifying whether an event identifier exists in the alert event data and populating the event identifier if no event identifier exists in the alert event data, and wherein accepting alert events and performing validation of the alert events by the alert capture module comprises mapping each alert event into the alert common format based on the event identifier.

10. The method of claim 1, further comprising inserting the ordered list of alert events into an alert packet and communicating the alert packet to the real time alerts queue.

11. The method of claim 1, wherein the business rules contain an indication of eligibility of an alert event for aggregation with other events.

12. The method of claim 1, further comprising performing, by the electronic computer processor, an aggregation process only for alert events having the same event type designation.

13. The method of claim 1, further comprising performing, by the electronic computer processor, a performance audit including only sufficient information to trace a selected alert event to functional process point such that the performance audit does not include information specific to a line of business or information regarding a particular alert event.

14. The method of claim 1, wherein the computing system comprises a computing system of a financial institution, and wherein the alert notifications comprise transactional information on accounts held by a subscriber with the financial institution.

15. The method of claim 1, further comprising aggregating alert events based on a line of business defined in the business rules.

16. The method of claim 1, further comprising deferring a notification of at least one alert event based on a line of business defined in the business rules.

17. The method of claim 1, wherein assigning the unique alert identifier to each new alert event comprises assigning the unique alert identifier based on the business rules.

18. A computer-implemented method for processing alert event information, the method comprising:
- receiving, by a computing system comprising an electronic computer processor and a non-transitory data storage media, event data from one or more source systems and storing the event data in the non-transitory data storage media, wherein receiving the event data is performed by a batch processing module reading from a flat file and separating data records into individual alert events embodied in the event data, wherein the flat file comprises a configurable flat file schema;
- processing, with the electronic computer processor, batch transactions including the alert events and real-time transactions including the alert events;
- accepting, with the electronic computer processor, alert events and performing validation of the alert events in an alert capture module, including mapping each alert event into an alert common format for use by multiple modules and components of the system;
- matching, with the electronic computer processor, the alert events with one or more corresponding subscription preferences stored in an alert preferences database operatively associated with a decision making module;
- combining, with the electronic computer processor, the alert events with the subscription preferences, wherein the subscription preferences are added to the alert events and the decision making module includes an alert subscription filter to accept alert events from one or more queues to filter the alert events in parallel;
- invoking, with the electronic computer processor, one or more business rules in association with the alert events and the subscription preferences with a business rules engine, the one or more business rules including a notification rule for generating a query of one or more notification templates from an alert notification template database and for generating a routing path from a notification engine for routing alert notifications;
- caching information related to at least one of the one or more business rules and the alert events into a singleton to be referenced in real-time;
- copying, with the electronic computer processor, alert event data to a working table of the non-transitory data storage media, and drawing the alert event data from the working table as the alert events are committed to a real time queue for immediate processing, wherein the alert event data is referenced in real-time from the singleton, wherein the alert data is deleted from the working table after being processed; and
- routing, with the electronic computer processor, alert notifications to one or more subscriber systems according to the alert events in the real time queue based on one or more subscription decisions.

19. The method of claim 18, wherein the batch processing module is configured to process only data records having a valid record format without halting the processing of data records due to data records having an invalid record format.

* * * * *